United States Patent [19]
Nichols et al.

[11] 3,888,602
[45] June 10, 1975

[54] STRESS RESTRAINING RING FOR COMPRESSOR ROTORS

[75] Inventors: Arnold Douglas Nichols, Simsbury; Cornelius Vickers Sundt, Windsor, both of Conn.

[73] Assignee: United Aircraft Corporation, East Hartford, Conn.

[22] Filed: June 5, 1974

[21] Appl. No.: 476,759

[52] U.S. Cl. .................................. 416/198; 416/218
[51] Int. Cl. ............................................ F01d 5/06
[58] Field of Search ........ 416/198, 198 A, 200–201, 416/218

[56] References Cited
UNITED STATES PATENTS

| | | | |
|---|---|---|---|
| 3,617,150 | 11/1971 | Wagle | 416/201 X |
| 3,688,371 | 9/1972 | Koff | 416/198 UX |

FOREIGN PATENTS OR APPLICATIONS

| | | | |
|---|---|---|---|
| 248,893 | 7/1969 | U.S.S.R. | 416/198 |

*Primary Examiner*—Everette A. Powell, Jr.
*Attorney, Agent, or Firm*—Stephen E. Revis

[57] ABSTRACT

The integral wing flange of a compressor disk is surrounded at its free end by an annular restraining ring which, in a preferred embodiment, has a smaller free state inner diameter than the outer diameter of the wing flange, thereby exerting a compressive force on the wing flange. The outer diameter of the restraining ring fits into a snap diameter of the next adjacent disk. During engine operation the wing flange deflects and creeps, but not as much as it would have without the restraining ring due to the initial compressive force. Also, when the two adjacent disks are disassembled the restraining ring prevents the flange from springing outwardly as much due to the creep thereby reducing the interference fit between the two disks when it is time to reassemble them.

4 Claims, 2 Drawing Figures

PERCENT CREEP GROWTH FOR REAR WING-RESTRAINING RING ASSEMBLY

STRESS RESTRAINING RING FOR COMPRESSOR ROTORS

BACKGROUND OF THE INVENTION
1. Field of the Invention

This invention relates to axial flow compressors for gas turbine engines.

2. Description of the Prior Art

In an axial flow compressor the temperature increases from stage to stage as one progresses toward the rear of the engine. As temperature increases the strength of the compressor disk decreases. A point is reached where a change to a move exotic stronger disk material is required. The disk of less exotic material, or first disk, may be connected to the disk of more exotic material, or second disk, by a cylindrical wing flange extending rearwardly from the first disk. The wing flange is supported on its outer diameter by an inner snap diameter on the second disk. As is often the case, the material of the second disk has a higher coefficient of expansion than the less exotic material of the first disk. Thus, during engine operation the second disk increases in diameter more than if it were made from the less exotic material of the first disk. This permits the wing flange of the first disk to deflect more than if the disks were of the same material. If the wing flange has a low creep strength the additional deflection may result in excessive creep growth or permanent deformation of the wing flange such that when the disks are disassembled, the wing flange will spring outwardly in diameter and reassembly may be extremely difficult. Further, excessive growth of the wing flange during engine operation poses the possibility of premature cracking of the flange in service due to low cycle fatigue.

SUMMARY OF THE INVENTION

An object of the present invention is reduced creep growth of a disk wing flange during engine operation.

Another object of the present invention is reduced expansion of a disk wing flange upon disengagement of the flange from its snap diameter so that reassembly is facilitated.

Accordingly, an integral cylindrical wing flange of a disk is surrounded, at its free end, by a restraining ring of stiffer material than the flange, the restraining ring fitting into a snap diameter of the next adjacent disk. In a preferred embodiment the restraining ring exerts a compressive force on the wing flange.

In the preferred embodiment the restraining ring performs two functions: First, it places the end of the wing flange under compression so that it is at first deflected somewhat inwardly; thus, during engine operation the overall outward growth of the flange past its free state diameter is reduced, even though its total growth is the same; this reduces the amount of creep growth and stress. Second, the restraining ring, being stiffer than the wing flange and not being subject to creep growth, reduces the outward expansion of the wing flange upon disassembly from the snap diameter of the adjacent disk so that reassembly is facilitated.

The foregoing and other objects, features and advantages of the present invention will become more apparent in the light of the following detailed description of a preferred embodiment thereof as illustrated in the accompanying drawing.

DESCRIPTION OF A PREFERRED EMBODIMENT

Figure 1:
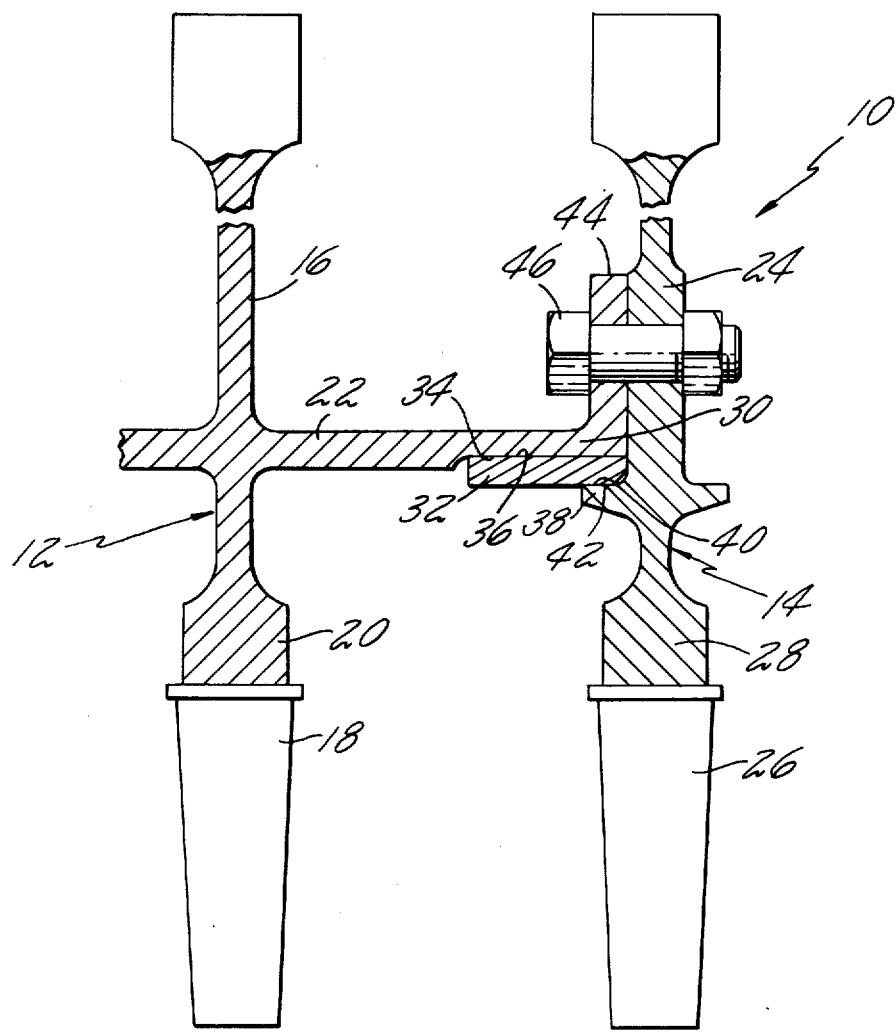
FIG. 1 is an illustrative cross-sectional view of two adjacent rotor stages of an axial flow gas turbine engine incorporating the subject invention.

Consider, as an exemplary embodiment of the subject invention, the portion of an axial flow gas turbine engine compressor 10 illustrated in FIG. 1. The portion of the compressor 10 shown in FIG. 1 comprises an upstream rotor assembly 12 and a downstream rotor assembly 14. The upstream rotor assembly 12 comprises an upstream disk 16 and a plurality of blades 18. The blades 18 are secured to the rim 20 of the disk 16 in the usual manner. The upstream disk 16 includes an annular wing flange 22 extending downstream thereof parallel to the axis of rotation of the disk and having a downstream end 30. (Although in this example the wing flange 22 is cylindrical, a conical flange is also contemplated as being within the scope of the present invention.) The wing flange 22 also includes an outwardly facing cylindrical surface 34 and an inwardly extending annular bolt flange 44 which is secured by suitable means to the downstream rotor assembly 14 such as by bolts 46. The downstream rotor assembly 14 includes a downstream disk 24 having a plurality of blades 26 secured to its rim 28 in the usual manner. The downstream disk 24 includes flange means 38 defining an inner snap diameter surface 40.

Disposed on the end 30 and surrounding the surface 34 is an annular restraining ring 32 having a radially inwardly facing surface 36 and a radially outwardly facing surface 42. When the rotor assembly 12, the rotor assembly 14 and the restraining ring 32 are in an unassembled state the diameter of the surface 42 is greater than the diameter of the surface 40, and the diameter of the surface 36 is no greater than the diameter of the surface 34 and is preferably smaller in diameter than the surface 34. Thus, in a preferred embodiment, there is an interference fit between the surfaces 34 and 36 and between the snap diameter surface 40 and the surface 42. In order to assemble the restraining ring 32 onto the end 30 of the wing flange 22 the restraining ring 32 is heated and then slipped over the end 30.

During operation the upstream disk 12 reaches temperatures of about 950°F and the downstream disk 14 reaches temperatures of about 1000°F. Due to the difference in temperatures the downstream disk 14 must be made of a stronger more exotic material than the upstream disk 12. In this embodiment the upstream disk 12 is made from titanium (6%Al-2%Sn-4%Zr-2% Mo-Bal Ti) and the downstream disk 14 is made from Incoloy 901 (12.5%Cr-0.1%C-34.0%Fe-2.6%Ti-6.0%Mo-Bal Ni) made by International Nickel Co. The coefficient of thermal expansion of titanium is $5.6 \times 10^{-6}$ and the coefficient of thermal expansion of Incoloy 901 is $8.5 \times 10^{-6}$. Also, the Incoloy 901 has a higher creep strength than the titanium. The net result is that during engine operation, because of the higher temperatures and the difference in materials, the downstream disk 14 grows more than the upstream disk 12. Thus, the end 30 of the wing flange 22 grows more than if the downstream disk 14 were made of the same material as the upstream disk 12. Actually, the downstream disk 14 grows so much more than the upstream disk 12 that the wing flange 22 experiences creep growth or permanent plastic deformation. On the other hand, the restraining ring 32 is made from much stiffer material than the wing flange 22 and preferably remains elastic throughout engine operation. In this example the restraining ring 32 is made from Incoloy 901, the same material as the disk 14, although it need not be the same material.

Figure 2:
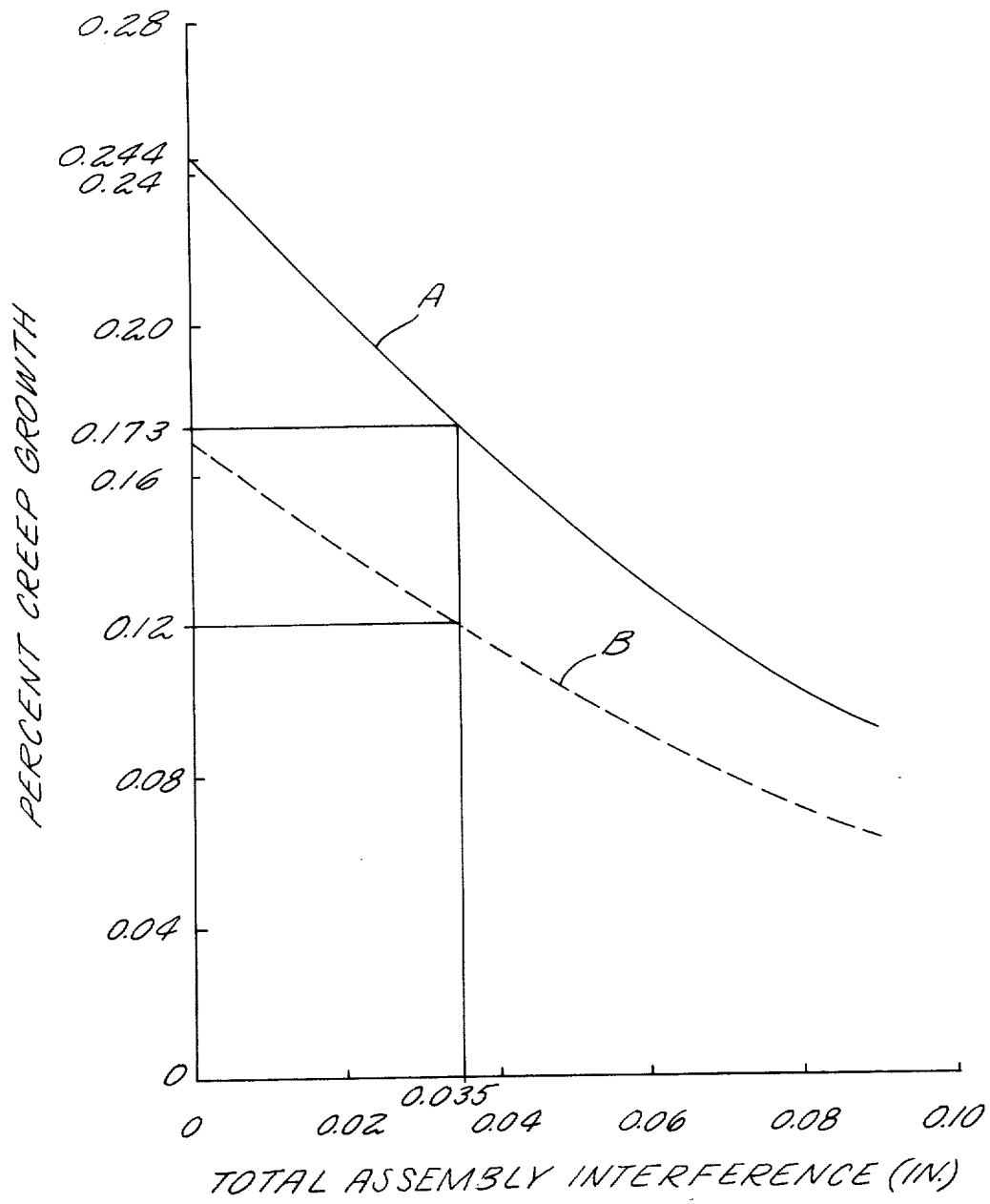
FIG. 2 is a graph illustrating the advantages of the present invention.

Consider now the graph shown in FIG. 2 which helps illustrate the advantages of the present invention. The graph plots percent creep growth on the vertical axis and the difference in free state diameters prior to use in an engine (total assembly interference) as between the surface 36 and the surface 34 on the horizontal axis. The curve A represents the "actual" amount of creep growth of the wing flange 22 for different amounts of assembly interference between the surfaces 36 and 34. For example, if there were a zero assembly interference fit between the surfaces 36 and 34 then the percent of creep growth of the wing flange 22 would be about 0.244%. In other words, when the disks 14 and 12 are disassembled after engine operation and the restraining ring 32 is removed from the wing flange 22 then the diameter of the surface 34 will spring outwardly to a diameter which is 0.244% greater than the free state diameter of the surface 34 prior to running it in the engine. If the free state diameter prior to running the disk 12 in the engine were, for example, 23 inches, then the new diameter would be 23.056 inches. This is the amount of creep growth occurring with unrestrained prior art constructions. The curve B represents the percent of creep growth which is seen after disassembly of the rotor assemblies 12, 14 but with the restraining ring 32 still in place. This is called "apparent" creep growth. In the foregoing example involving zero interference fit the "apparent" percent creep growth is 0.168% which is about a 30% reduction from the "actual" creep growth. Thus, for this example, although the restraining ring 32 does not reduce the "actual" amount of creep growth of the wing flange 22, it does prevent the wing flange 22 from moving radially outwardly as far as it would like upon disassembly. This significantly reduces the reassembly interference fit which occurs at the snap diameter 40.

Referring once again to the graph of FIG. 2, consider the preferred embodiment of the present invention wherein the wing flange 22 and the restraining ring 32 are assembled with a free state interference fit of 0.035 inches. The wing flange, in that instance, is deflected radially inwardly by the restraining ring 32 and is initially under compressive stress. During engine operation the downstream disk 14 grows by the same amount as before, but as it grows the wing flange 22 first moves back to its free state diameter before it begins moving out past its free state diameter so that its net radially outward movement past its free state diameter is less than if it had not been put under compression by the restraining ring 32. Its "actual" percent creep growth is thus less than in the first example and is shown, from the curve A, as being 0.173%. Once again, upon disassembly the wing flange 22 wants to move radially outwardly to a diameter which is 0.173% larger than the original free state diameter but is prevented from doing so by the restraining ring 32; instead the wing flange 22 (along with its associated restraining ring 32) moves radially outwardly only 0.12% of its original free state diameter, as can be seen from the curve B. This is a better than 50% reduction in the percent creep growth of an unrestrained prior art wing flange. Thus, in this example the present invention cuts the reassembly interference fit at the snap diameter 40 by a factor of two. A further advantage is reduced stress in the wing flange 22 due to the smaller deflection past the free state diameter.

Although in this preferred embodiment the downstream disk material has both a higher coefficient of thermal expansion and a higher creep strength than the wing flange 22, the present invention is also useful for limiting the creep growth of the wing flange 22 even if only the creep strength of the downstream disk (and not the coefficient of thermal expansion) is higher than that of the wing flange.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. An axial flow compressor for a gas turbine engine comprising:

an upstream compressor disk made from a first material and including an integral, axially extending wing flange having a downstream end, said downstream end including a radially outwardly facing cylindrical surface;

a downstream compressor disk made from a second material adjacent and connected to said upstream compressor disk and including means defining an inner snap diameter surface; and a restraining ring disposed on said downstream end and having an outer snap diameter surface and a radially inwardly facing cylindrical surface, said radially inwardly facing cylindrical surface abutting said radially outwardly facing cylindrical surface, said radially inwardly facing cylindrical surface having a free state diameter no greater than the free state diameter of said radially outwardly facing cylindrical surface, said outer snap diameter surface abutting said inner snap diameter surface, said restraining ring having the characteristic that it is stiff relative to the stiffness of said wing flange, said wing flange having the characteristic that it creeps during engine operation, said second material having a creep strength higher than said first material.

2. The axial flow compressor according to claim 1 wherein said second material has a coefficient to thermal expansion higher than said first material.

3. The axial flow compressor according to claim 2 wherein the free state diameter of said inwardly facing cylindrical surface is less than the free state diameter of said outwardly facing cylindrical surface.

4. The axial flow compressor according to claim 3 wherein said restraining ring has the characteristic that it is elastic throughout engine operation.

* * * * *